United States Patent [19]
vom Braucke et al.

[11] Patent Number: 4,741,149
[45] Date of Patent: May 3, 1988

[54] GARDEN AND/OR YARD-CLEANING IMPLEMENT

[75] Inventors: Hans vom Braucke, Vlotho; Manfred vom Braucke, Bielefeld; Dieter Westerwelle, Bielfelder, all of Fed. Rep. of Germany

[73] Assignee: Bielefelder Kuchenmaschinen-und Transport-geratefabrik vom Braucke GmbH, Bielefeld, Fed. Rep. of Germany

[21] Appl. No.: 943,055

[22] Filed: Dec. 18, 1986

[30] Foreign Application Priority Data

Dec. 21, 1985 [DE] Fed. Rep. of Germany ... 8536153[U]

[51] Int. Cl.⁴ ............................................. A01D 7/10
[52] U.S. Cl. .................... 56/400.04; 15/111; 294/51
[58] Field of Search ........... 56/400.04, 400.05, 400.06, 56/400.07; 15/111; 294/51, 54.5

[56] References Cited

U.S. PATENT DOCUMENTS

| | | | |
|---|---|---|---|
| 599,368 | 2/1898 | Starkwether | 56/400.06 |
| 603,071 | 4/1898 | Ake | 15/111 |
| 893,080 | 7/1908 | Kuettner | 15/111 |
| 1,050,685 | 1/1913 | Peacock | 56/400.06 |
| 1,174,804 | 3/1916 | Bell | 56/400.05 |
| 1,424,291 | 8/1922 | Frank | 15/111 |
| 1,632,883 | 6/1927 | Carkey | 56/400.07 |
| 2,114,518 | 4/1938 | Bayliss | 56/400.07 |
| 2,533,838 | 12/1950 | Ranft | 15/111 |
| 2,746,234 | 5/1956 | Utley | 56/400.12 |
| 2,780,976 | 2/1957 | Koering | 56/400.04 |
| 2,919,163 | 12/1959 | Benton | 294/51 |
| 3,084,369 | 4/1963 | Hawkins | 15/111 |
| 3,084,498 | 4/1963 | Straley | 56/400.04 |
| 3,095,682 | 7/1963 | Pasquine | 56/400.12 |
| 3,601,966 | 8/1971 | Kerry | 56/400.12 |
| 3,733,636 | 5/1973 | Osadsky | 294/51 |
| 4,048,735 | 9/1977 | Brunty | 294/51 |
| 4,143,899 | 7/1979 | Wetherall et al. | 294/50.9 |
| 4,185,448 | 1/1980 | Blanco | 56/400.12 |
| 4,565,398 | 1/1986 | Poulin | 56/400.04 |
| 4,644,740 | 2/1987 | Lee | 56/400.04 |

Primary Examiner—Paul J. Hirsch
Attorney, Agent, or Firm—Zarley, McKee, Thomte, Voorhees & Sease

[57] ABSTRACT

A garden- and/or yard-clearing implement which serves as a multi-purpose implement comprising a basic tool, such as a rake, shovel or the like, mounted on a handle, and an additional tool accessory displaceably mounted on the basic tool; wherein, preferably an attachment bar is displaceably mounted on the basic tool, and the tool accessory is mounted on the attachment bar with the attachment bar, which carries the tool accessory being displaceably retained on the resilient tines of a leaf rake and the tool accessory preferably being in the form of a brush or ice scraper.

2 Claims, 2 Drawing Sheets

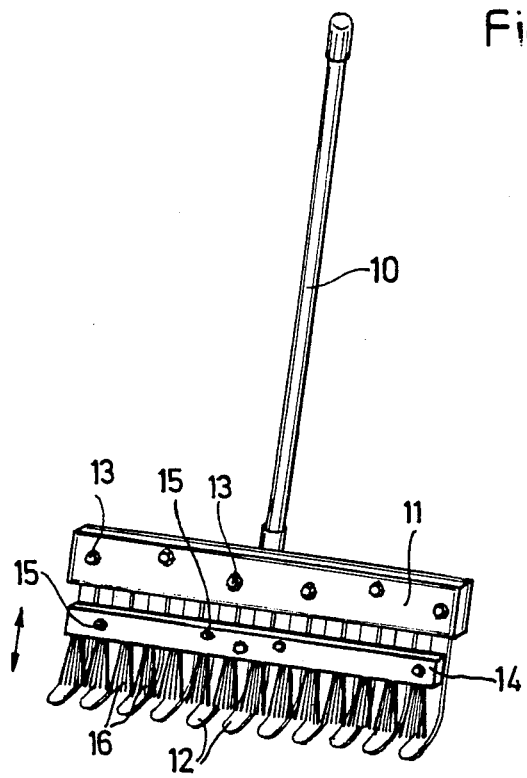
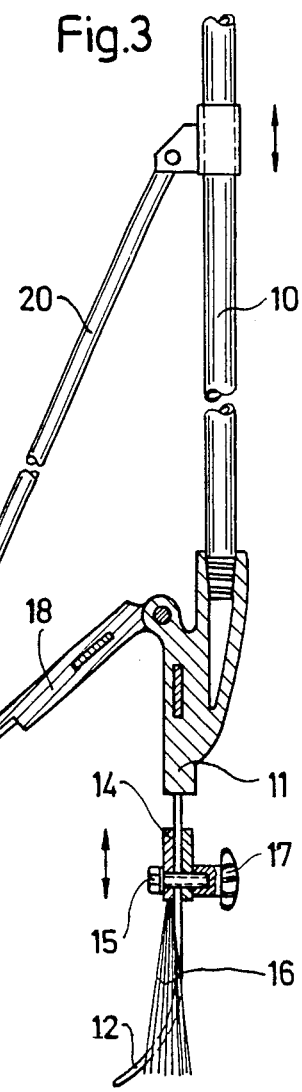
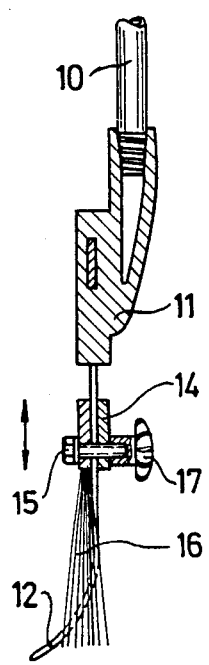

GARDEN AND/OR YARD-CLEANING IMPLEMENT

The invention relates to a garden- and/or yard-cleaning/clearing implement which is manually operable as a multi-purpose implement.

Known examples of hand implements are simple leaf rakes (fan-shaped besoms, wire brushes), leaf-gathering rakes (twin-fan-type besoms) or shovels for gathering leaves or snow.

With such hand implements, the planar tool, such as a flat besom or a shovel plate, is securely or detachably mounted on a handle.

A simple leaf rake, such as a so-called fan-shaped or wire besom, may only be used for the specific purpose of sweeping leaves. With a leaf-gathering rake (gripper rake) which is formed from one fan which is mounted on the handle and one additional fan which is pivotally disposed thereon, it is possible to gather the leaves together as well as being able to compress them in a clamp-like manner to permit better conveyance.

Snow shovels having a curved shovel plate formed from metal or plywood are suitable for gathering snow on flat ground surfaces. Consequently, these implements can only be used for raking or shovelling purposes.

If it is also desirable to use a besom or brush or an additional snow shovel on the surface, separate hand implements are needed therefor which always have to be available and therefore require plenty of storage space.

The invention seeks to provide a multi-purpose implement for use as a garden- and/or yard- or like cleaning implement which serves not only to sweep or gather leaves, to compress them in a clamp-like manner to form piles and to enable them to be removed, but also to sweep over the surface in the same way as with a narrow besom or to clear snow, ice, or the like, from the surface.

With a garden- and/or yard-cleaning hand implement according to the invention, this object is achieved in that an additional tool accessory is displaceably (detachably) mounted on the basic tool, such as a leaf-gathering besom or the like.

Thus, according to the present invention there is provided a garden- and/or yard-clearing implement which serves as a multi-purpose implement comprising a basic tool, such as a rake, shovel or the like, mounted on a handle and an additional tool accessory displaceably mounted on the basic tool.

The displaceable (adjustable) provision of one or more tool accessories which are easy to change-over permits the cleaning implement to have a multiple use which avoids the need for different individual tools.

The implement includes few component parts and is economical to manufacture. It requires little storage space.

Embodiments of the invention will be described further, by way of example, with reference to the accompanying drawings, in which:

FIG. 1 is a perspective view of a simple leaf rake having a besom or brush bar as a tool accessory;

FIG. 2 is a cross-sectional view of the same simple leaf rake;

FIG. 3 is a cross-sectional view of a leaf-gathering rake having a besom or brush accessory;

Figure 4:
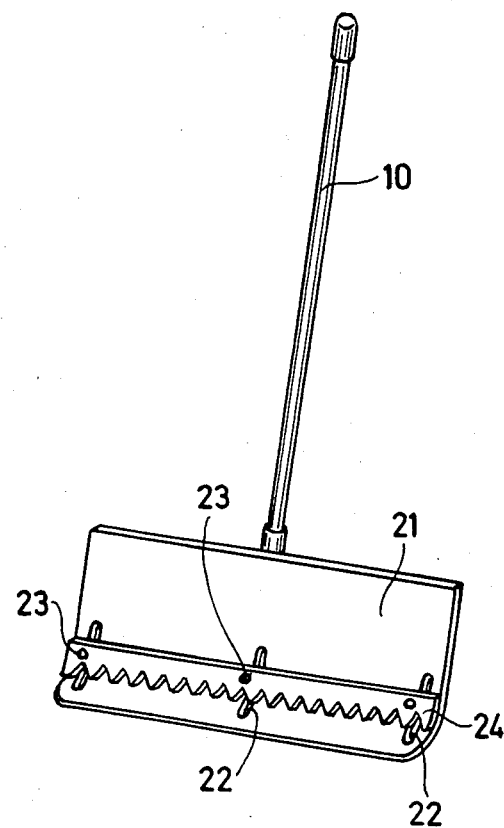
FIG. 4 is a perspective view of a snow shovel having an ice scraper bar accessory.

According to FIGS. 1 and 2, a transverse plate 11 which is formed from plastics material, for example, is mounted on a handle 10 and has inserted therein the individual, narrow, flat, resilient tines or strips 12 which are formed from metal or plastics material to form a leaf rake. This transverse plate 11 may be formed from a single component part or two component parts which are screwed together by means of screws 13.

In the central region of these resilient strips 12 which are bent at one end, a two-part attachment bar 14 is likewise adjustably secured by means of screws 15, with individual bristles 16 being provided therein.

For this attachment bar 14 which is provided with besom or bristle tufts 16, the resilient strips 12 form slide rails along which the attachment bar 14 can be slid upwardly and downwardly when hand nut 17 is loosened, with the result that, in the lower position, the tufts 16 protrude below the free, lower ends of the resilient strips 12 so that the hand implement can be used not only as a rake, but also as a besom or brush for sweeping.

When the attachment bar 14 is in its upper position, the tufts 16 are in their inoperative position. The attachment bar 14 may be removed completely and replaced, for example, by an attachment bar 24 which serves as an ice-removing bar, as shown in FIG. 4, and such bars 24 can each be moved upwardly and downwardly on the resilient strips 12 which serve as rails.

In the modified embodiment shown in FIG. 3, the attachment bar 14 is displaceably (and detachably) mounted on the resilient strips 12 of a leaf-gathering rake, an additional transverse plate 18 being pivotally mounted on the transverse bar 11 and having resilient tines or strips 19 which can be pivoted, by means of an operating rod 20 (only part thereof shown), in such a manner that, once the leaves have been raked together, they may be compressed in a clamp-like manner to enable them to be readily carried away.

FIG. 4 illustrates a snow shovel which serves as a multi-purpose hand implement and has adjustment screws 23 of an ice scraper bar attachment 24 secured in elongate slots 22 formed in the substantially rigid snow-plough-like shovel plate 21 of the implement. The ice scraper bar attachment 24 is formed from metal and when displaced downwardly to extend below the lower edge of plate 21 and secured, can scrape away ice with its corrugated lower edge better than the edge of the snow shovel plate 21.

As examples of tool accessories, prongs or tines may also be detachably (interchangeably) mounted on the basic tool as cultivators for loosening and aerating the surface of soil and for hoeing purposes, or they may be displaceably mounted on the basic tool as furrowers.

Figure 5:
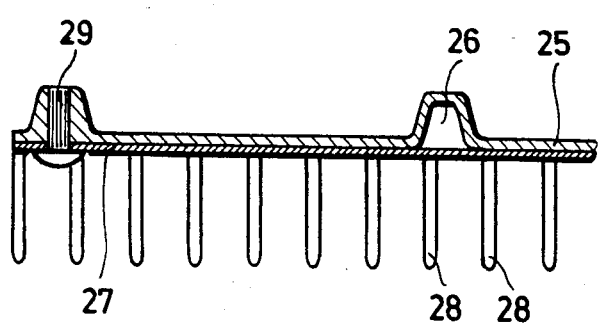
FIG. 5 is a plan view of part of a modified arrangement of an adaptor shown partially in cross-section.

An additional implement is illustrated in part in FIG. 5 and is an accessory for the garden- and/or yard-cleaning implements described and illustrated in FIGS. 1 to 4, by means of which it is possible to provide a further function for the multi-purpose hand implement. The additional implement comprises an attachment bar 25 with retention eyelets or U-shaped guide bars 26 to enable the attachment bar 25 to be mounted on the basic tool 11–16 in a steplessly adjustable and detachable manner.

A support bar 27 is riveted to this attachment bar 25 (by rivets 29) and is provided with curved, resilient or rigid tines 28. These tines 28, especially if they are resilient, narrow metal strips, permit even larger (thicker) layers of leaves or other debris to be moved. As already stated, soil can be loosened, hoed or aerated by these tines 28 which serve as cultivators, especially when the tines are rigid. Consequently, grooves may also be made in the soil.

Such an attachment bar 25 may also be guided in grooves (slots 22) in the basic tool, and retaining means such as key-shaped wedges, cotters or the like may be inserted separately into the protruding retention eyelets or guide bars 26, so that the attachment bar 25 can easily be removed again.

The arrangement illustrated in FIG. 5 may also replace the main part of the arrangement illustrated in FIG. 1. In such case, the attachment bar 25 and the support bar 27 replace the transverse plate 11. The resilient or rigid tines 28 replace the broader resilient strips 12. The attachment bar 25 and the support bar 27 are riveted together in a non-detachable manner. The guide bar or retention eyelet 26 accommodates the handle 10 which is securable therein.

We claim:

1. A cleaning implement for gardens or yards, comprising:

an elongated handle having a lower end;

a transverse elongated plate secured to the lower end of said handle;

a plurality of flat resilient tines having upper and lower ends and being secured by their upper ends to said elongated plate, the lower ends of said tines terminating in a curved portion;

an elongated adjustment bar adjustably secured to and slidably mounted on said tines and being disposed in parallel relation to said elongated plate;

a plurality of broom tufts having upper and lower ends and being secured by their upper ends to said adjustment bar and extending downwardly therefrom; and the length of said tines being sufficient to permit said elongated bar to be vertically adjusted thereon so that the lower end of said broom tufts can be positioned in a range of positions from above the lower ends of said tines to below said lower ends of said tines.

2. The device of claim 1 wherein a second transverse plate having upper and lower edges is pivotally secured by its upper end to said first mentioned transverse plate, a plurality of resilient tines secured to said second transverse plate and extending downwardly therefrom, and a rod having upper and lower ends being pivotally secured to the lower edge of said second transverse plate at its lower end and slidably secured to said handle by its upper end.

* * * * *